United States Patent [19]

Ueshin

[11] Patent Number: 4,690,268

[45] Date of Patent: Sep. 1, 1987

[54] SHEET CONVEY APPARATUS

[75] Inventor: Akito Ueshin, Kawasaki, Japan

[73] Assignee: Tokyo Shibaura Denki Kabushiki Kaisha, Kawasaki, Japan

[21] Appl. No.: 867,421

[22] Filed: May 16, 1986

Related U.S. Application Data

[63] Continuation of Ser. No. 555,542, Nov. 28, 1983, abandoned.

[30] Foreign Application Priority Data

Nov. 30, 1982 [JP] Japan ............................... 57-209693

[51] Int. Cl.[4] ............................................... B65G 47/24

[52] U.S. Cl. .................................... 198/399; 198/405; 198/626; 209/534; 209/545

[58] Field of Search ............... 198/399, 398, 400, 405, 198/626; 209/534, 545; 235/379

[56] References Cited

U.S. PATENT DOCUMENTS

| | | | |
|---|---|---|---|
| 2,145,786 | 1/1939 | Birkmeyer | 198/626 |
| 3,280,995 | 10/1966 | Barkley | 198/405 X |
| 3,726,386 | 4/1973 | Chishdm | 198/405 |
| 3,767,028 | 10/1973 | Rosso | 198/405 |
| 4,226,324 | 10/1980 | Stocker | 198/405 |
| 4,479,574 | 10/1984 | Julius et al. | 198/405 X |
| 4,520,932 | 6/1985 | Matsuda et al. | 209/545 |
| 4,524,268 | 6/1985 | Fukatsu | 209/534 X |

FOREIGN PATENT DOCUMENTS

| | | | |
|---|---|---|---|
| 0051598 | 4/1979 | Japan | 209/534 |
| 0818684 | 8/1959 | United Kingdom | 198/405 |

*Primary Examiner*—Robert J. Spar
*Assistant Examiner*—Lyle Kimms
*Attorney, Agent, or Firm*—Cushman, Darby & Cushman

[57] ABSTRACT

A sheet convey apparatus which conveys a mixture of obverse and reverse-sheets set at an inlet port to a collecting section, comprises a first convey path for conveying obverse-presented bills which are distinguished from reverse-presented bills by a sorting convey path, and a second convey path disposed parallel to the first convey path, for conveying reverse-presented bills which are to be reversed.

10 Claims, 24 Drawing Figures

SHEET CONVEY APPARATUS

This is a continuation of application Ser. No. 555,542, filed Nov. 28, 1983, which was abandoned upon the filing hereof.

BACKGROUND OF THE INVENTION

The present invention relates to a sheet convey apparatus for conveying a mixture of obverse- and reverse-presented sheets set at an inlet port to a collecting device.

A bill sorter/stacker has been developed as a sheet collecting apparatus wherein sheets such as bills or bank notes including various denominations are at once inspected and sorted/counted in accordance with the inspection results.

In the bill sorter/stacker of this type, first denomination bills (e.g. 100-dollar or 20-pound notes), second denomination bills (e.g. 50-dollar or 10-pound notes), third denomination bills (e.g. 10-dollar or 5-pound notes) and fourth denomination bills (e.g. 5-dollar or 1-pound notes) are sorted and stacked in four collecting chambers, respectively. When the bills of one batch have been sorted and stacked, the dispensing ports of the collecting chambers are opened, and the bills of each denomination are stacked in the respective bill compartments. Thereafter, bills of a next batch are subject to sorting and collecting.

However, in the conventional bill sorter/stacker of the type described above, there are four collecting chambers and among them two collecting chambers for obverse-presented bills and two other collecting chambers for reverse-presented bills are prepared to collect obverse- and reverse-presented bills of four denominations. Specifically, bills of the first denomination are collected in the first set of collecting chambers for obverse- and reverse-presented bills, and bills of the second denomination are collected in the second set of collecting chambers for obverse- and reverse-presented bills. Thereafter, bills of the third denomination are collected in either the first or second set of collecting chambers, and bills of the fourth denomination are collected in the other of the two sets of collecting chambers. Thus, only bills of two denominations can be sorted at one time; and, when bills of four denominations must be collected, double sorting/collecting time is required, resulting in inconvenience.

Due to the above problem, there is a current demand for a system which can automatically align the sides of the bills on the convey path which leads to the sorting/collecting section, and can collect obverse or reverse-presented bills of four denominations at once.

SUMMARY OF THE INVENTION

The present invention has been contrived in view of the above situation, and has for its object to provide a sheet convey apparatus wherein a mixture of obverse- and reverse-presented bills is processed, to obtain all of the obverse-presented bills moving along a convey path.

To achieve the above object of the present invention, a paper convey apparatus is provided wherein a mixture of obverse- and reverse-presented bills is discriminated by a sorting means, with the obverse-presented bills being conveyed along a first convey path and the reverse-presented bills being conveyed along a second convey path for reverse disposition, in such a way as to be parallel to the first convey path, thereby merging all of the obverse-presented bills.

DETAILED DESCRIPTION OF THE PREFERRED EMBODIMENT

One embodiment of a sheet collecting apparatus according to the present invention which is exemplified by a bill sorter/stacker to which the apparatus is applied will be described in detail with reference to the accompanying drawings.

Figure 1:
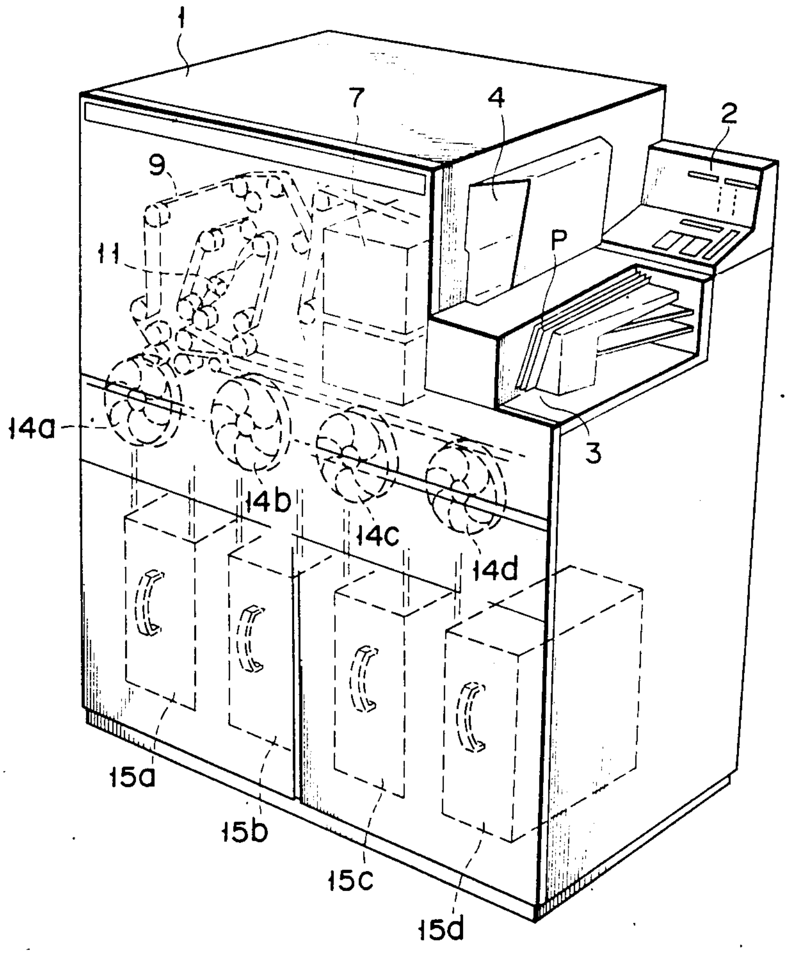
FIG. 1 is a schematic perspective view showing the construction of a bill sorter/stacker to which one embodiment of a sheet collecting apparatus according to the present invention is applied.
Figure 2:
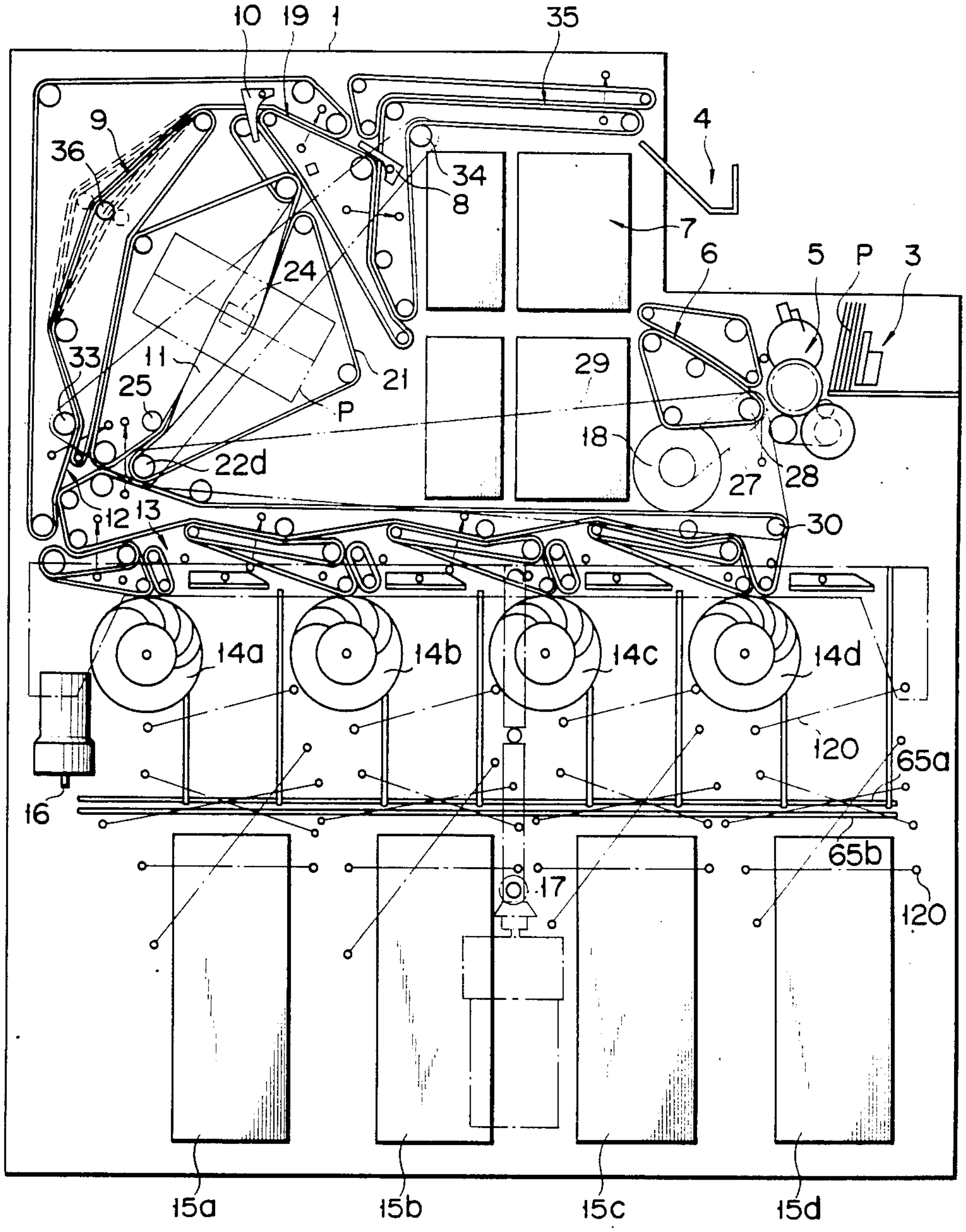
FIG. 2 is a schematic front view showing the construction of the bill sorter/stacker.
Figure 3:
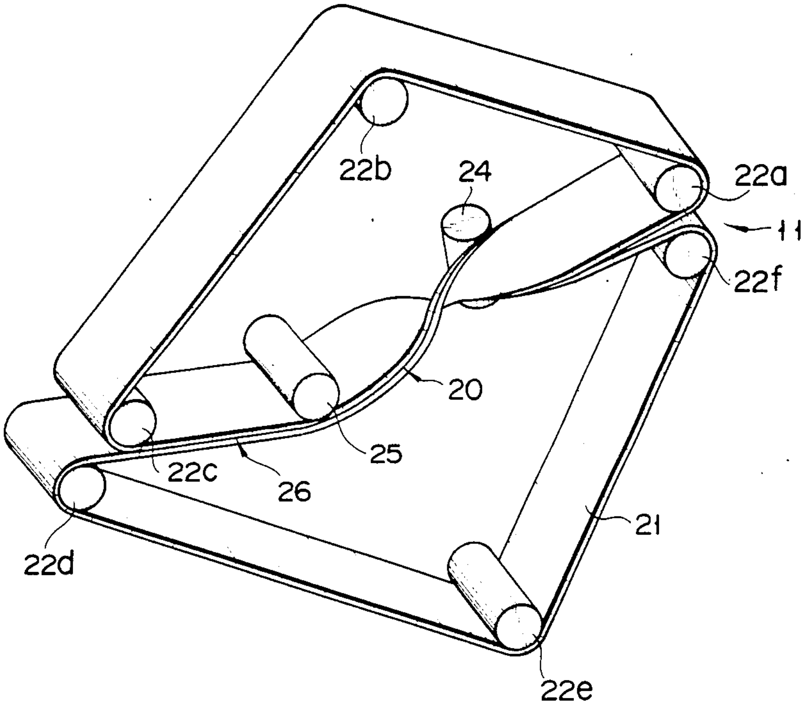
FIG. 3 is a perspective view showing a twisted convey path.

FIG. 1 is a schematic perspective view showing the construction of a bill sorter/stacker to which one embodiment of a sheet collecting apparatus according to the present invention is applied. FIG. 2 is a schematic front view showing the construction of the bill sorter/stacker.

Referring to FIG. 1, reference numeral 1 denotes a main housing of the bill sorter/stacker. A display control panel 2 is arranged at the upper right portion of the main housing 1. A bill insertion port 3 and a bill rejection port 4 are disposed on the main housing 1 in the vicinity of the display control panel 2. A bill take-in unit 5 is disposed inside the main housing 1 so as to oppose the bill insertion port 3, as shown in FIG. 2. Bills P placed in the insertion port 3 are taken by the bill take-in unit 5 into the main housing 1 one after another. Each bill P is then conveyed along a take-in convey path 6. The convey direction of the bill is preset to be perpendicular to the longitudinal direction of the bill so as to minimize a convey distance of the bill. The bill passes by a discrimination section 7 for discriminating the denomination, authenticity, fit/unfit, and an obverse-/reverse-presented bill. The discrimination section 7 is disposed midway along the take-in convey path 6. Each bill is thus subjected to discrimination in the discrimination section 7.

The take-in convey path 6 terminates at the upper central portion of the main housing 1. A return path 35 and a central convey path 19 branch from the terminal end of the take-in convey path 6. The return path 35 terminates at the bill rejection port 4. The central convey path 19 terminates at a location spaced a predetermined distance from the terminal end of the convey path 6. A first selector gate 8 is disposed at the terminal end of the take-in convey path 6 to selectively gate the bill to one of the return path 35 and the central convey path 19.

A first convey path 9 for conveying an obverse-presented bill and a second convey path 11 for conveying a reverse-presented bill branch from the terminal end of the central convey path 19. The first and second convey paths 9 and 11 merge at a merge section 12 located at a rear, mid-height portion, and terminate thereat. A second selector gate 10 is disposed at the terminal end of the central convey path 19 to selectively gate a bill which reaches there to one of the first and second convey paths 9 and 11.

When a bill P is discriminated to be abnormal, it is guided by the first selector gate 8 from the take-in convey path 6 to the return path 35 and then transferred to the bill rejection port 4. However, a normal bill P is guided by the first selector gate 8 from the take-in convey path 6 to the central convey path 19. A bill P which is discriminated by the discrimination section 7 to be an obverse-presented bill is guided by the second selector gate 10 from the central convey path 19 to the first convey path 9. However, a bill P which is discriminated by the discrimination section 7 to be a reverse-presented bill is guided by the second selector gate 10 from the central convey path 19 to the second convey path 11. The second convey path 11 has a side-reversing function, so that the reverse-presented bill can be reversed by this path to an obverse-presented bill. The convey time along the first convey path 9 is the same as that along the second convey path 11. Therefore, bills conveyed at a given pitch are selected by the second selector gate 10 and are conveyed into different convey paths 9 and 11. When the separated bills merge again at the merge section 12, they will not collide with each other since they are conveyed at the same pitch.

The obverse-presented bills P are then conveyed to a sorting convey path 13 as a sorting section connected to the merge section 12, and are sorted in accordance with the four denominations. Collecting units **14*a*, 14*b*, 14*c* and 14*d* for collecting the bills one above another sorted in accordance with the four denominations, and a shutter unit 16 for supporting the bills P collected in the collecting units 14*a*, 14*b*, 14*c* and 14*d* and for storing the bills in compartments 15*a*, 15*b*, 15*c* and 15*d* disposed below the units 14*a*, 14*b*, 14*c* and 14*d*, respectively, as need arises are disposed under the sorting convey path 13. A push-in unit 17 is disposed to firmly push the bills P into the respective compartments 15*a* to 15*d*** at the same time.

The second convey path will be described with reference to FIGS. 2 to 6C.

Figure 4:
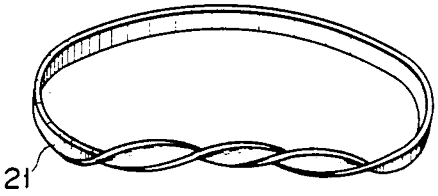
FIG. 4 is a perspective view showing the twisted state of the conveyor belt constituting the convey path.
Figure 5:
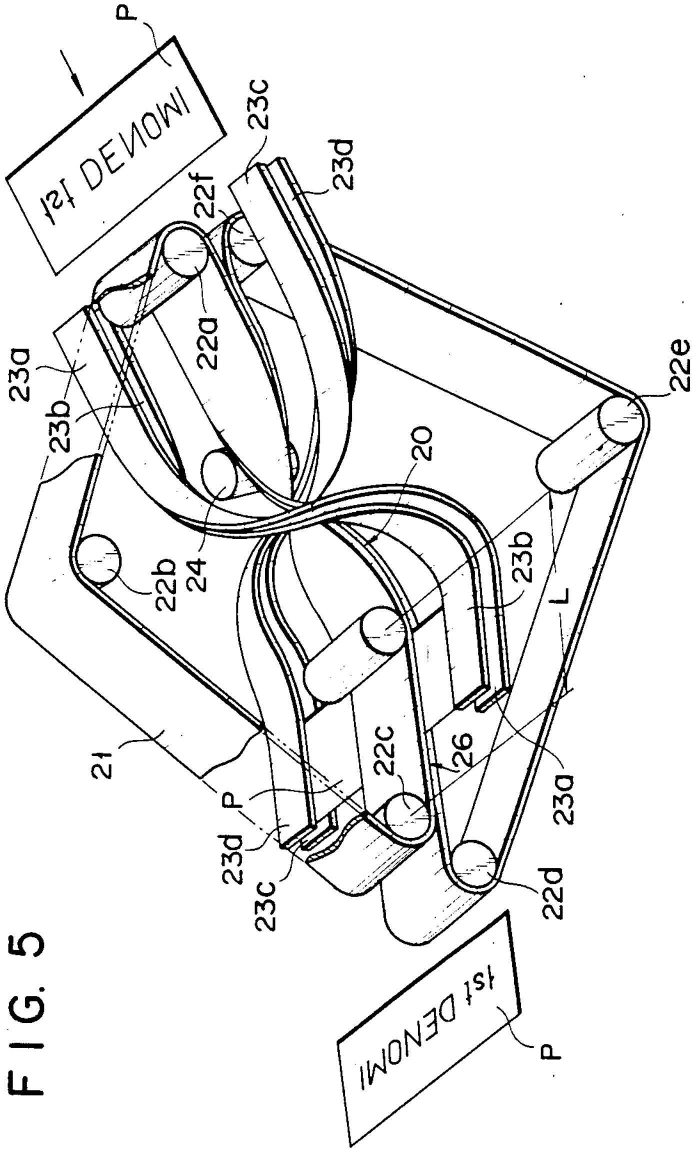
FIG. 5 is a perspective view of a side reversing unit.

The second convey path 11 has a twisted convey path 20 as a side reversing convey unit. The leading end and the trailing end of the twisted convey path 20 are twisted by 180°. As shown in FIG. 4, a leading end of a belt is twisted by 720° (two complete turns) with respect to a trailing end thereof so as to form an endless elastic belt (to be referred to as a twisted belt hereinafter) 21, and the twisted belt 21 is then looped around a plurality of rollers **22*a* to 22*f* in an 8-shaped manner. Thus, the twisted convey path 20 is constituted by the opposing surfaces of the twisted belt. Furthermore, as shown in FIG. 5, first plate-shaped twisted guides 23*a* and 23*b* are disposed along one side of the twisted convey path 20, and second plate-shaped twisted guides 23*c* and 23*d* are disposed along the other side thereof. These guides 23*a* to 23*d* are supported by columns (not shown), respectively. The first twisted guides 23*a* and 23*b* or the second twisted guides 23*c* and 23*d* constitute a pair which forms a gap (FIG. 6A) therebetween and are twisted along the twisted belt 21**.

Figure 6A:
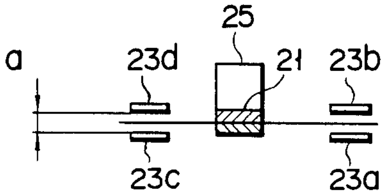
FIG. 6A is a side view showing a guide state by a twisted guide mechanism.
Figure 6B:
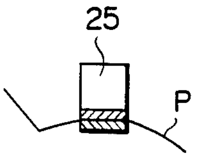
FIGS. 6B and 6C are side views each showing a held state of a bill when it is conveyed in a twisted manner.
Figure 6C:
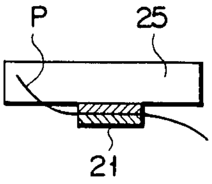
Figure 7:
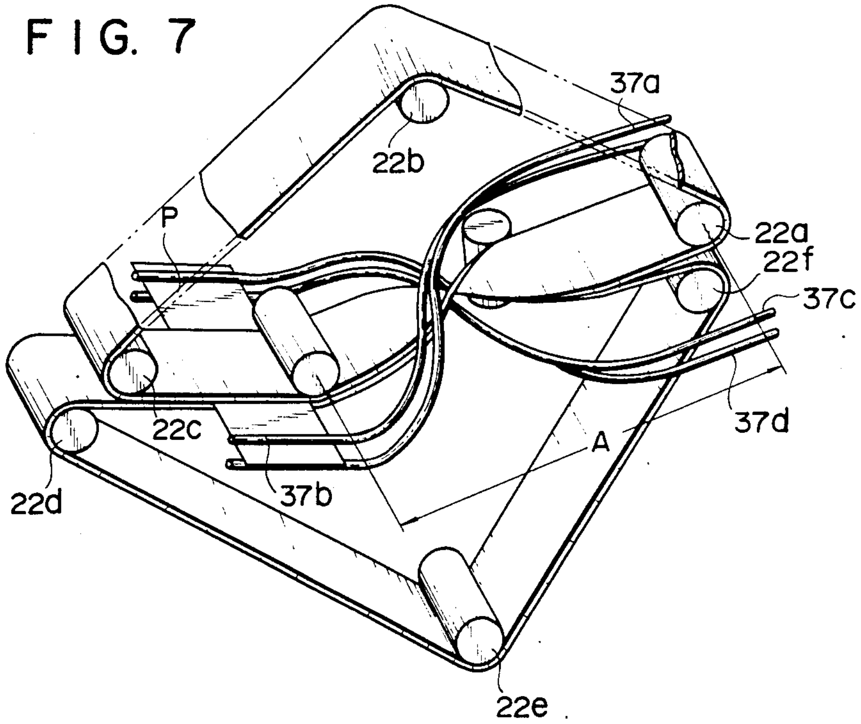
FIG. 7 is a perspective view showing a modification of a twisted guide mechanism.
Figure 8:
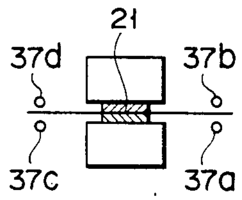
FIG. 8 is a side view of the twisted guide mechanism as shown in FIG. 7 so as to show the convey state of the bill conveyed in a twisted manner.

The first and second twisted guides **23*a* to 23*d* are located at both sides of the twisted belt 21 from the leading end to the trailing end of the twisted convey path 20. These twisted guides 23*a* to 23*d* serve to properly guide the bill P which is folded into quarters or halves, or is very soft. More particularly, when the bill P which is folded into quarters or is soft is reversed by 180° by the twisted belt 21 at a high speed without incorporating the guides 23*a* to 23*d*, the air pressure acts on the bill P and the bill tends to be folded or skewed, resulting in inconvenience as shown in FIG. 6B. In order to prevent such a problem and properly reverse and convey the bill, both ends of a bill P must be firmly supported so as to guide the bill. The first guides 23*a* and 23*b* and the second guides 23*c* and 23*d*** serve to constantly guide both ends of the conveyed bill, respectively.

Reference numerals 24 and 25 denote first and second idle rollers, respectively. The second idle roller 25 is located at the after half portion of the twisted convey path 20 and abuts against an upper side portion of the twisted belt 21 defining the twisted convey path 20 so as to form a horizontal convey path 26 between the second idle roller 25 and the rollers **22*c* and 22*d* which define the trailing end of the twisted convey path 20. Since the bill P is forcibly twisted by the twisted convey path 20, it tends to be kept twisted. Therefore, when this twisted bill P merges with the obverse-presented bill P conveyed from the first convey path 9, a jam tends to occur. For this reason, after the bill is turned upside down, a flat convey path (e.g., the horizontal convey path 26) is required so as to flatten any twist of the bill. Reference symbol L denotes a length of the horizontal convey path 26 and corresponds to a length of at least one bill. The twist of the bill is corrected by the horizontal convey path 26, and then the bill merges with the bills conveyed along the first convey path 9**.

The first idle roller 24 is located at the center (rear surface of the upright portion of the twisted belt 21) of the twisted portion formed between the second idle roller 25 and the rollers **22*a* and 22*f* which define the leading end of the twisted convey path 20. The first idle roller 24 gives a clamping force to the twisted belt 21 which properly clamps the bill. When a force acting to restore the nontwisted state of the twisted belt 21 acts, the upper and lower sides of the twisted belt defining the twisted convey path 20 are separated from each other. As a result, the convey force against a bill cannot be provided. The first idle roller 24** is required to prevent this.

The length of each of the idle rollers 24 and 25 located on the twisted convey path 20 must be equal to or smaller than the width of the twisted belt 21. Since the bill P is reversed and conveyed along the twisted convey path 20, the bill P is conveyed such that both ends thereof are bent in opposing directions (FIG. 6C) (bending occurs due to the twisting force of the twisted belt). Therefore, when each of the rollers 24 and 25 has a length greater than the width of the belt, both ends of the bill collide with the roller 24 or 25.

A motor 18 is arranged below the take-in convey path 6 in the main housing 1 so as to drive the convey paths described above, as shown in FIG. 2. The conveyor belts constituting the convey path 6 travel when a drive roller 28 in the convey path 6 is driven by the motor 18 through a drive belt 27. A drive belt 29 is also looped around the drive roller 28, a drive roller 30 for the sorting convey path 13, and the drive roller **22*d* for the second convey path 11, so that the conveyor belts which respectively constitute the second convey path 11 and the sorting convey path 13 are driven A drive belt 32 is looped around the drive roller 22*d*, a drive roller 33 for the first convey path, and a drive roller 34 for the return path 35 so as to drive the conveyor belts which constitute the first convey path 9 and the return path 35**.

As has been apparent from the above description, only the roller **22*d*, which is included in the rollers 22*a* to 22*f* around which the twisted belt 21 is looped, and which is disposed at the trailing end of the twisted convey path 20, serves as the drive roller. Therefore, that portion of the belt 21 which defines the twisted convey path 20 and the horizontal convey path 26 serve as the taut portions to prevent an irregular speed, loosening and misalignment of the belt 21, and hence prevent jam, skew or the like of bills. As a result, the bill P can be properly turned upside down. When the motor 18** is energized, all the convey paths are driven at the identical speed.

Although the convey distance of the first convey path 9 is the same as that of the second convey path 11, the actual convey time will not be identical due to slippage between the belt and rollers. In order to prevent this, the conveyor belts constituting the first convey path 9 are made of an elastic member, and a movable roller 36 is disposed to correct the convey time. When the roller 36 is moved by a driving means (not shown) as indicated by the dotted line in FIG. 2, the convey distance can be adjusted so as to coincide the convey time of the bill conveyed along the first convey path 9 with that along the second convey path 11. The pitch of the bills P conveyed along the first and second convey paths 9 and 11 at the merge section 12 is the same as that at the second selector gate 10. The order of bills will not change, the bills will not collide with each other, or the operation timings will not change.

The bill P clamped between the belts of the take-in convey path 6 is discriminated by the discrimination section 7. The normal bill or note P is guided by the first selector gate 8 to the central convey path 19. The normal obverse-presented bill P is then guided to the first convey path 9, while the normal reverse-presented bill P is selected by the second selector gate 10 and guided to the second convey path 11. The reverse-presented bill P is reversed along the twisted convey path 20. Both ends of the bill P are firmly guided by the two pairs of first and second guides **23*a* to 23*d*. The twist of the reversed bill (i.e., obverse-presented bill) is corrected along the horizontal convey path 26. Thereafter, the bill merges at the merge section 12 with the originally obverse-presented bill P conveyed along the first convey path 9** at the same pitch as that before the merging.

Figure 9A:
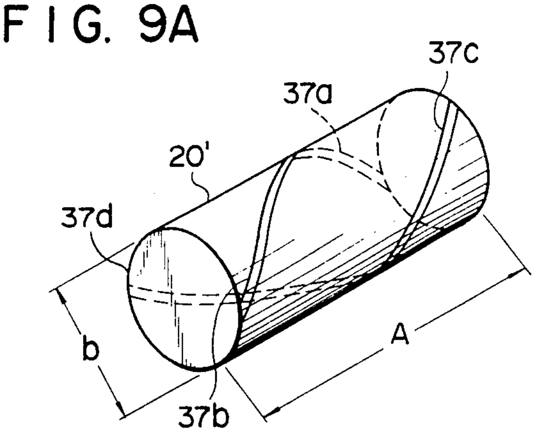
FIGS. 9A and 9B are perspective views for explaining degrees of twisting of the twisted guide mechanism of FIG. 7, respectively.
Figure 9B:
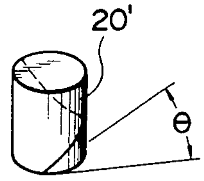

As shown in FIG. 5, the twisted guides **23*a* to 23*d* which comprise plate-shaped members can comprise members each having a circular section, thereby obtaining the same effect as in the plate-shaped members. In this case, the bill P can be rotated by 180° and is conveyed along the twisted convey path 20. Therefore, twisted guides 37*a* to 37*d* may be helically wound around an imaginary cylinder 20' (i.e. around the convey path 20), as shown in FIGS. 9A and 9B. The guides 37*a* to 37*d* comprise a helical spring at a lead angle $\theta$ ($\tan\theta = 2b/\pi a$) where b is the diameter of the cylinder 20'** and A is the reversing convey distance, so that the two ends of the bill P can be supported to prevent skew or the like.

The sorting convey path 13 conveys the bills P which are respectively conveyed along the first and second convey paths 9 and 11 and which merge at the merge section 12, and sorts the bills P in accordance with the four denominations and stores the sorted bills P in the collecting units **14*a* to 14*d*. The sorting convey path 13** is constituted as follows.

Figure 10:
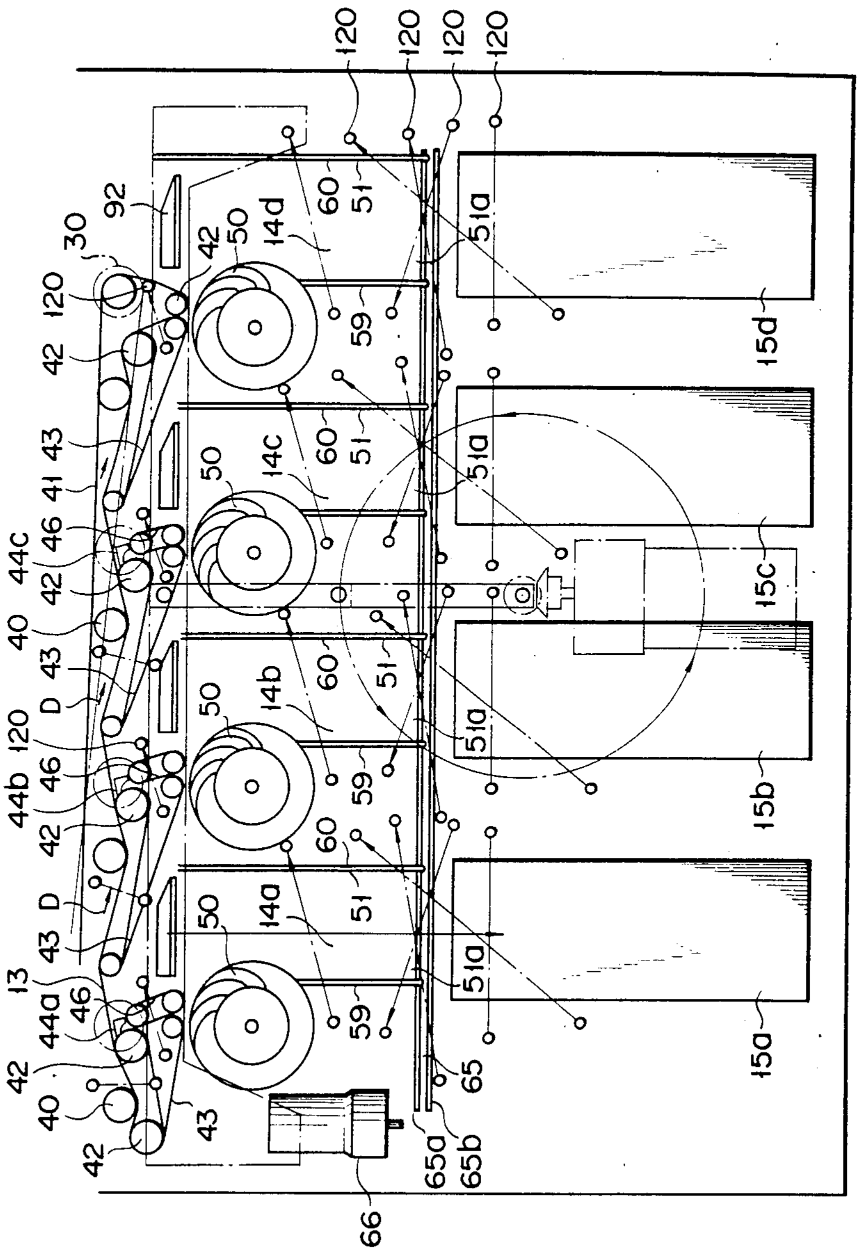
FIG. 10 is a schematic front view showing the internal construction of a sorting/collecting section shown in FIG. 1.
Figure 11B:
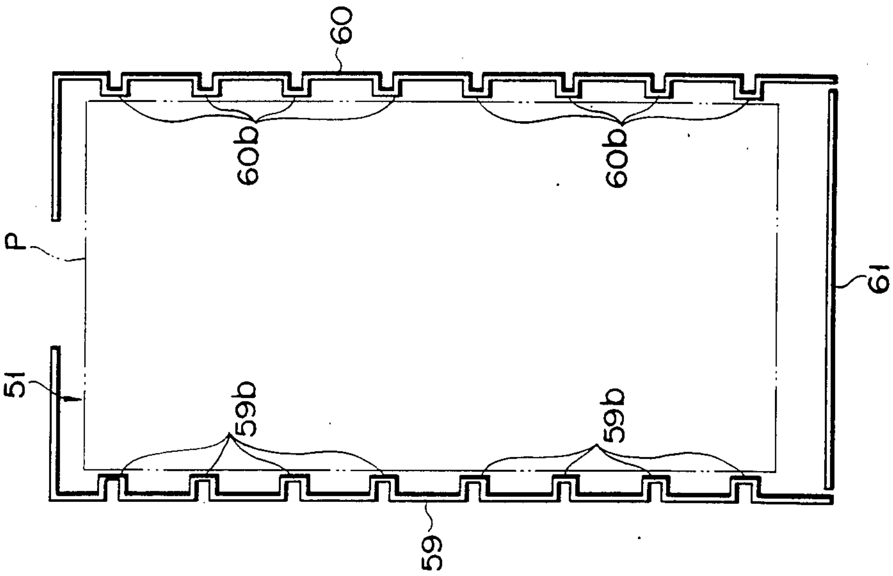
FIG. 11B is a plan view showing the collecting chamber.
Figure 11A:
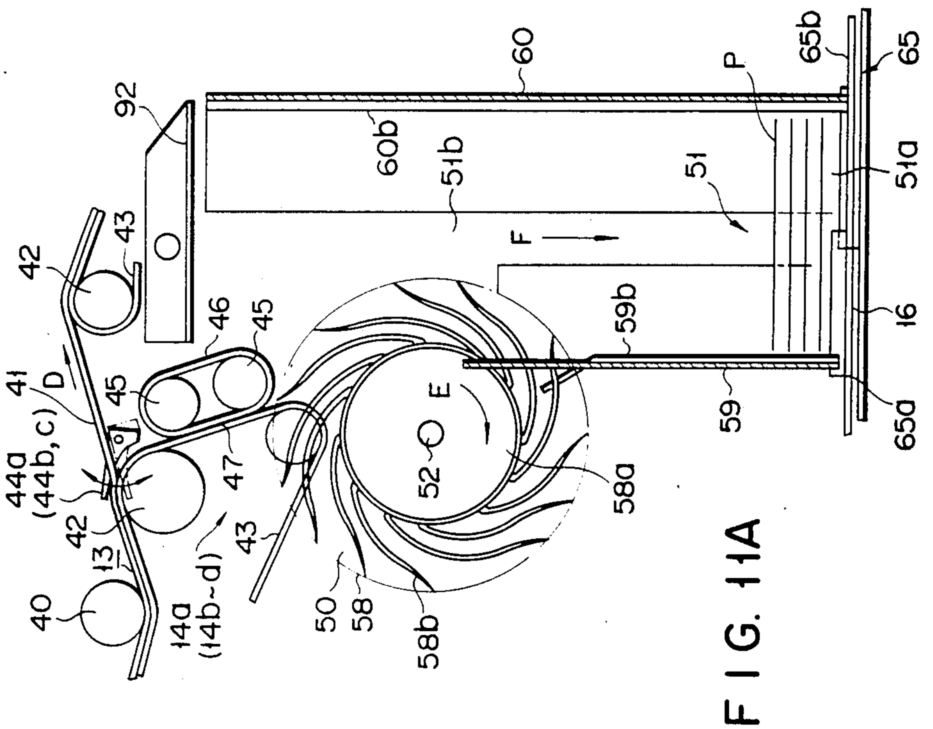
FIG. 11A is a schematic front view showing the construction of the collecting unit.

As shown in FIGS. 10 and 11A, the sorting convey path 13 is arranged such that the bill P is clamped and conveyed in the direction indicated by arrow D by opposing surfaces of a conveyor belt 41 looped around a plurality of guide rollers 40 and a drive roller 30 and of four conveyor belts 43 looped around a plurality of guide rollers 42 so as to partially contact with a lower surface of a substantially flat portion of the conveyor belt 41. Selector gates **44*a*, 44*b* and 44*c* for pivotal operation by means of a rotary solenoid (not shown) are disposed at those portions of the sorting convey path 13 which respectively correspond to the first to third collecting units 14*a* to 14*c*. The selector gates 44*a*, 44*b* and 44*c* selectively guide the bills to the collecting units 14*a* to 14*c***, respectively.

The bills sorted by the selector gates **44*a*, 44*b* and 44*c* are respectively conveyed to the first to third collecting units 14*a* to 14*c* through a convey path 47 formed by the opposing surfaces of a substantially vertical portion of the conveyor belt 43 and a conveyor belt 46 looped around a pair of guide rollers 45 so as to partially contact with the substantially vertical portion. The bill P guided to the fourth collecting unit 14*d* is directly conveyed in the fourth collecting unit 14*d* at the trailing end portion of the sorting convey path 13 which is constituted by the opposing surfaces of the conveyor belt 41 and the conveyor belt 43 at the right in FIG. 10. The sorting convey path 13 having the construction described above subsequently clamps and conveys the bills P, conveyed from the merge section 12, by means of the conveyor belts 41 and 43**.

When the denomination of the bills P, conveyed in accordance with the discrimination result given by the discrimination section 7, is given as the first denomination, the rotary solenoid (not shown) is energized, and the selector gate 44a is pivoted clockwise from the position indicated by the two-dots and dashed line (FIG. 11A) to the position indicated by the solid line (FIG. 11A). Therefore, the first denomination bill or note is guided downward by the selector gate 44a and is guided to the convey path 47. Thereafter, the rotary solenoid (not shown) is deenergized, so that the selector gate 44a returns to the position indicated by the two dots and dashed line (FIG. 11A). When the second denomination bill or note is conveyed, the selector gate 44b is operated in the same manner as the selector gate 44a. Similarly, when the third denomination bill or note is conveyed, the selector gate 44c is operated in the same manner as the selector gate 44a. Furthermore, when the fourth denomination bill or note is conveyed, the selector gates 44a, 44b and 44c will not pivot, so that the bill is conveyed to the trailing end of the sorting convey path 13. In this manner, the bills P guided to the sorting convey path 13 are sorted in accordance with the four denominations.

The operation of the collecting units 14a, 14b, 14c and 14d for collecting the sorted bills P will be described with reference to FIGS. 10 to 12.

The first collecting unit 14a disposed below the selector gate 44a in correspondence therewith, the second collecting unit 14b disposed below the selector gate 44b in correspondence therewith, the third collecting unit 14c disposed below the selector gate 44c in correspondence therewith, and the fourth collecting unit 14d disposed below the trailing end of the sorting convey path 13 have identical construction. Each of the collecting units 14a to 14d comprises an impeller mechanism 50 for stacking the sorted bills conveyed along the corresponding convey path 47 or the trailing end of the sorting convey path 13, and a collecting chamber 51 disposed below the corresponding impeller mechanism 50 to stack the bills by guiding both side edges of the sorted bills.

Figure 11C:
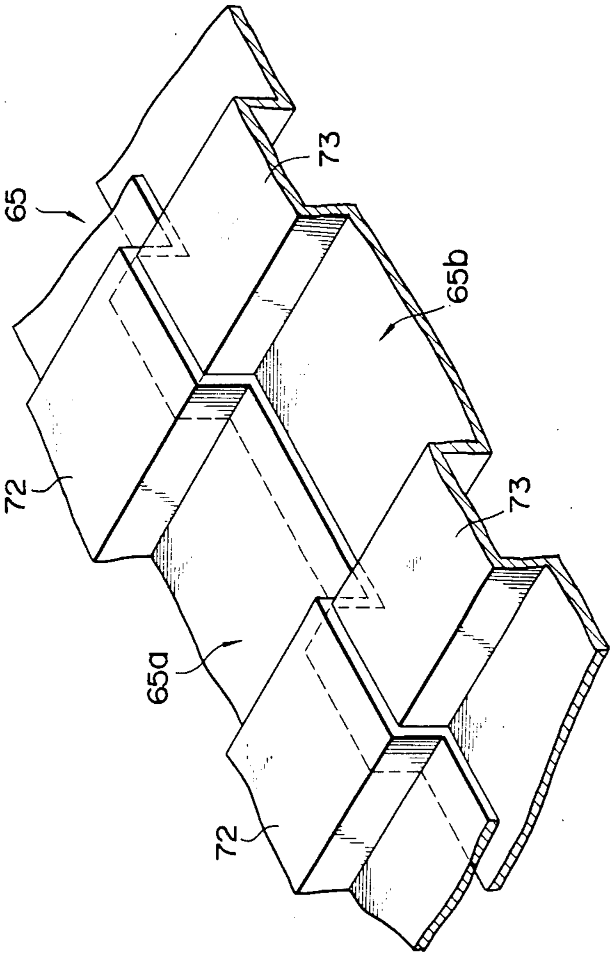
FIG. 11C is a perspective view showing the nested state of first and second partition plates of the shutter.
Figure 12:
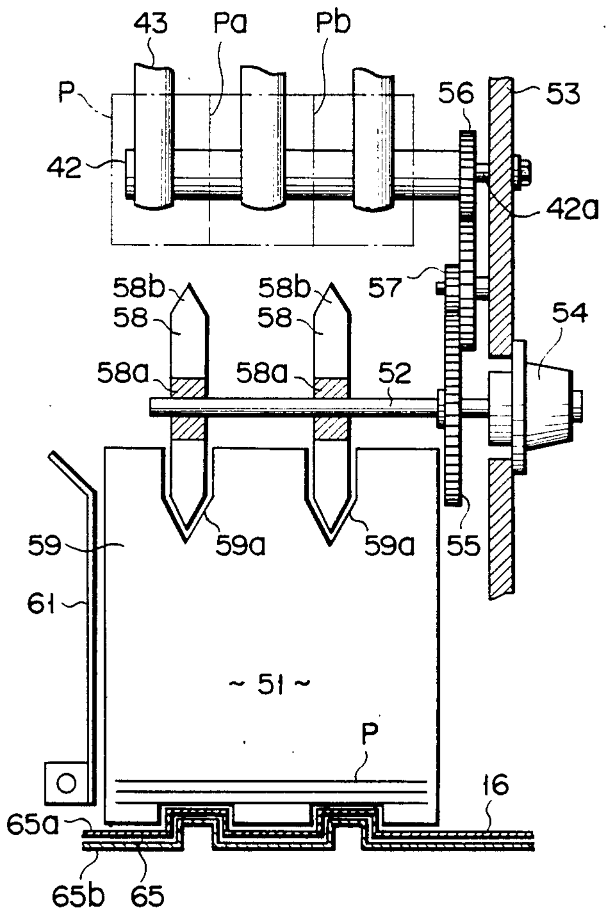
FIG. 12 is a schematic side view showing the construction of the collecting unit.

The detailed construction of the impeller mechanism 50 and the collecting chamber 51 are shown in FIGS. 11A to 12. The impeller mechanism 50 has a shaft 52 both ends of which are rotatably supported by bearings 54 attached to side frames 53. A driven gear 55 is mounted on the shaft 52. A shaft 52a of the guide roller 42 is rotatably attached to the side frames 53. A driving gear 56 is mounted on the shaft 52a. An intermediate gear mechanism 57 is disposed between the driving gear 56 and the driven gear 55, so that, when the guide roller 42 is rotated upon rotation of the drive belt 29, the drive gear 56, the intermediate gear mechanism 57 and the driven gear 55 are subsequently rotated. As a result, the pair of impellers 58 mounted at the intermediate portions of the shaft 52 rotate. Each impeller 58 comprises an impeller ring 58a fixed on the shaft 52, and a plurality of blades 58b which are mounted on the circumferential surface of the ring 58a to be spaced apart from each other at equal intervals. The proximal ends of the blades radially extend from the circumferential surface of the ring 58a, and the distal ends thereof are arcuated along a predetermined direction. The distance between the adjacent blades 58b becomes narrower from the distal ends thereof toward the proximal ends thereof. The blades 58b are disposed in a vortex shape. The impellers 58 are mounted on the shaft 52 outside folding lines pa and pb of the bill P so as not to coincide with these folding lines pa and pb, as shown in FIG. 12.

Although an illustration is omitted, even when a folding line which is used to fold the bill P into halves is present in the bill P, this folding line will not coincide with the impellers 58. When the pair of impellers 58 are disposed in this manner, the bill which has a folding line or the like will not cause jamming in the impellers 58.

Each of the collecting chambers 51 is formed between a left wall plate 59 having a pair of notches 59a (FIG. 12) at its upper portion so as to allow travel of the blades 58b therethrough and a right wall plate 60 which defines a space between itself and the left wall plate 59 to stack the bills P such that bills are stacked in the direction of thickness and which opposes the left side wall 59. Each collecting chamber 51 has upper and lower open ends. The lower opening of the collecting chamber 51 is defined as a dispensing port 51a, and the upper opening thereof is defined as an insertion port 51b. A transparent acrylic plate 61 is disposed at the front side of each collecting chamber 51 so as to be freely opened/closed.

The left and right wall plates 59 and 60 have projections 59b and 60b along the bill drop direction or stacking direction (direction F in FIG. 11A), respectively, as shown in FIG. 11B. The left and right wall plates 59 and 60 are formed of embossed conductive metal plates, respectively. Therefore, the wall plates have small contact areas with the bills P, so that the bills P can smoothly drop on the shutter unit 16. Furthermore, static electricity generated upon contact between the bills P with the impellers 58 and the conveyor belts 41, 43 and 46 can be properly removed through the projections 59b and 60b. As a result, the irregular dropping and collection of the bills P which are caused by static electricity can be completely eliminated. The left and right wall plates 59 and 60 may comprise plastic plates coated with a conductive material.

The operation of the collecting units 14a to 14d will be described.

The bills P sorted by the sorting convey path 13 in accordance with the four denominations are conveyed to one of the first to fourth collection units 14a to 14d. For example, when the first denomination bill or note is conveyed, the bill is guided by the selector gate 44a toward the impellers 58 rotated in the direction indicated by arrow E (FIG. 11A). In this case, the impellers 58 are rotated at a peripheral speed corresponding to $\frac{1}{4}$ of the bill convey speed at the sorting convey path 13. The bill P is inserted between the blades 58b of the impellers 58 and is conveyed between the blade 58b and the ring 58a. Upon rotation of the impellers 58, the bill P is slowly conveyed and is removed by the edges of the left wall plate of the collecting chamber 51 defining the notches 59a. The bill P then drops on the shutter unit 16 partitioning the compartments 15a to 15d to be described in detail later. The following bill P carried by the impellers 58 is stacked such that the following bill P is stacked on the preceding bill P.

The shutter unit 16 will be described in detail with reference to FIGS. 10 to 14B.

The shutter unit 16 comprises: four first partition plates 65a and four second partition plates 65b, a pair of first and second partition plates being disposed to constitute a bottom plate, under an abutting condition, placed to close the dispensing port 51a of each of the collecting units 14a, 14b, 14c and 14d and which can be spaced apart from each other; and a drive section 66 for reciprocating the partition plates 65a and 65b relative to each other. When the partition plates 65a and 65b are in contact with each other, the dispensing ports 51*a* are closed. However, when the partition plates 65*a* and 65*b* are separated from each other, the dispensing ports 51*a* are opened. The four first partition plates 65*a* are connected to each other to move at the same time. Likewise, the four second partition plates 65*b* are connected to each other to move at the same time. The first and second partition plates 65*a* and 65*b* together constitute a shutter 65.

Figure 13A:
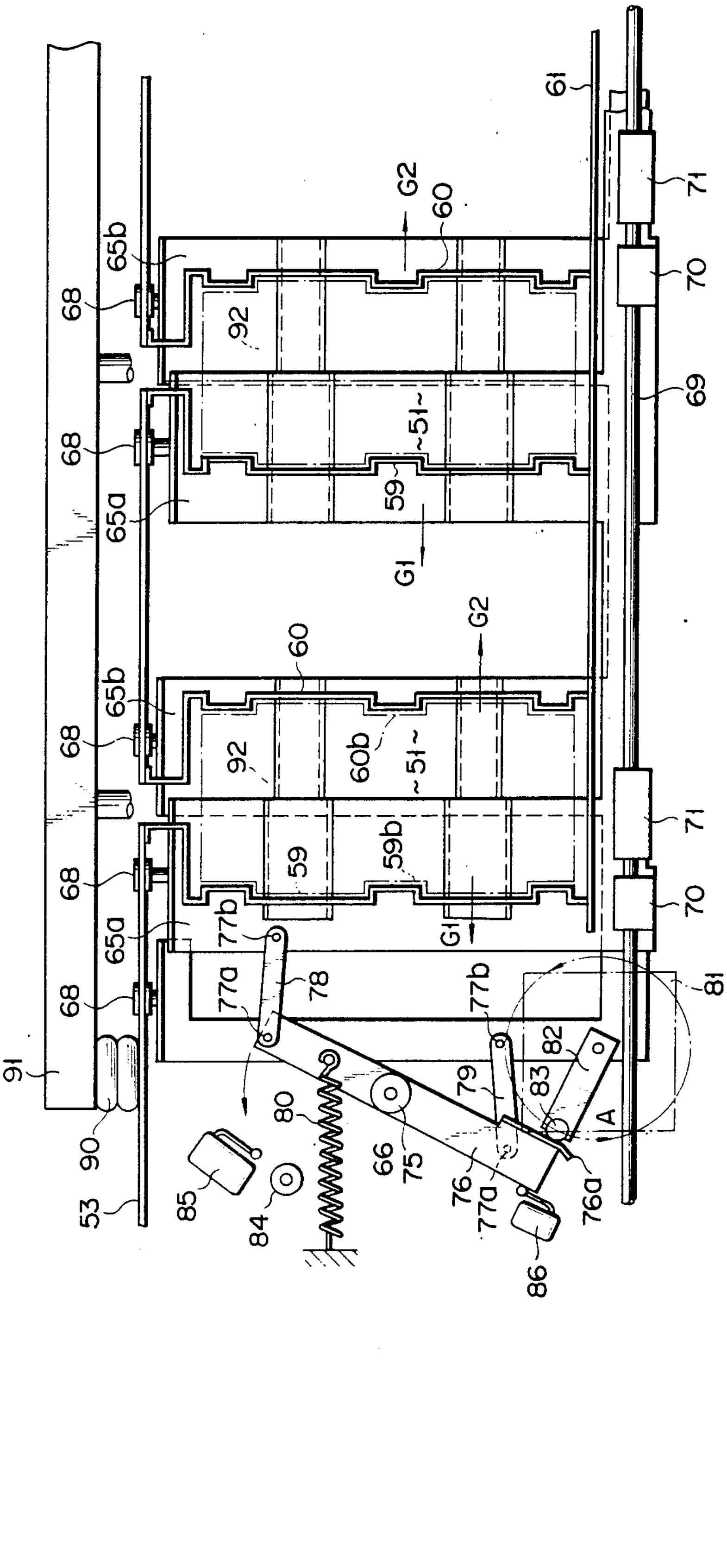
FIG. 13A is a plan view showing the shutter mechanism wherein the shutter thereof is closed.
Figure 13B:
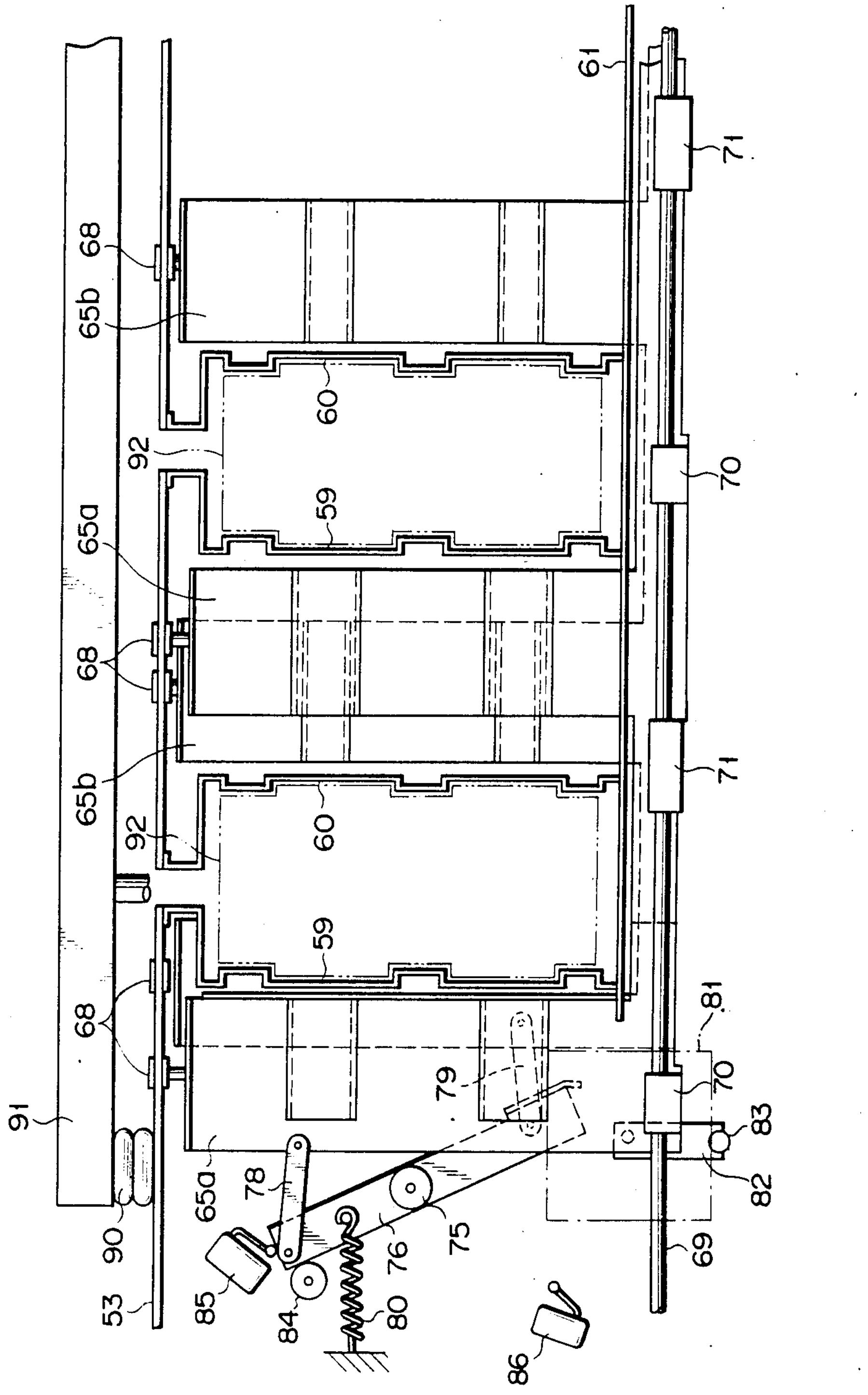
FIG. 13B is a plan view showing the shutter mechanism wherein the shutter thereof is opened.
Figure 14A:
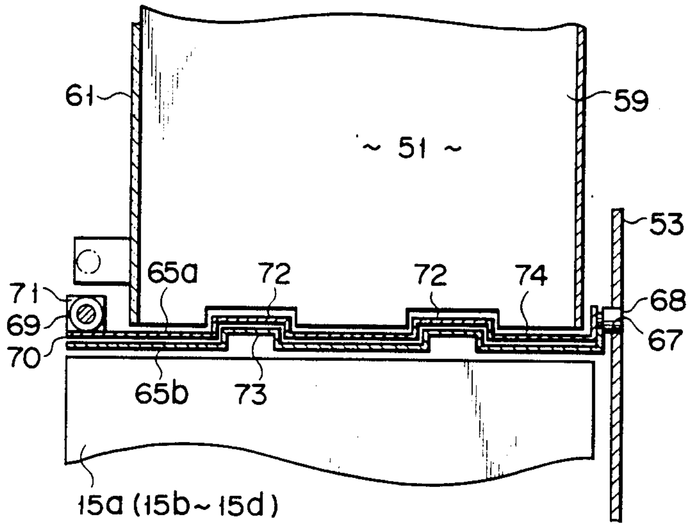
FIG. 14A is a schematic side sectional view showing the construction of the shutter mechanism.
Figure 14B:
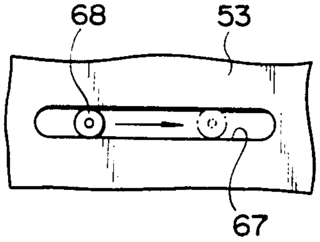
FIG. 14B is a front view showing a partition plate support of the shutter mechanism.

The compartments 15*a* to 15*d* respectively corresponding to the collecting units 14*a* to 14*d* are disposed under the shutter 65. The detailed construction of the shutter unit 16 is illustrated in FIGS. 13A, 13B, 14A and 14B. FIGS. 13A and 13B are plan views showing the schematic construction of the shutter unit 16, and only illustrate a portion located below the first and second collecting units 14*a* and 14*b*. However, the shutter unit 16 also extends below the third and fourth collecting units 14*c* and 14*d*. The portion which extends below the units 14*c* and 14*d* is the same as that for the units 14*a* and 14*b*, and a detailed description is omitted. FIG. 14A is a right side view of the shutter unit 16. One end of each of the first and second partition plates 65*a* and 65*b* connected to each other is held to reciprocate through a corresponding one of rollers 68 fitted in corresponding elongated roller grooves 67 (one groove is illustrated in FIG. 14B) formed in the corresponding side frames 53 in the main housing 1. The other end of each of the first and second partition plates 65*a* and 65*b* is supported at the position corresponding to the side frames 53 to reciprocate through slide bearings 70 and 71 mounted on a shaft 69 fixed in the main housing 1.

Each first partition plate 65*a* is bent to form a pair of projections 72 extending upward. Each second partition plate 65*b* is also bent to form a pair of projections 73 which extend in the same manner as the projections 72. Each first partition plate 65*a* is disposed with respect to the corresponding second partition plate 65*b* such that the pair of projections 72 overlap the pair of projections 73, as shown in FIG. 11C. The projections 72 are nested with the left wall plate 59 of the collecting chamber 51 (FIG. 14A). Similarly, the projections 73 are nested with the right wall plate 60 in the same manner as the projections 72. These nested states are provided to prevent the bill P from being inserted in a gap 74 between the wall plates 59 and 60 and the partition plates 65*a* and 65*b* when the bills P placed on the partition plates 65*a* and 65*b* drop upon movement of the first and second partition plates 65*a* and 65*b* apart from each other.

The detailed construction of the drive section 66 will be described below. The drive section 66 includes an arm 76 which is rotatably attached to a shaft 75 at a central portion of the arm 76. The shaft 75 is mounted on a bracket (not shown) which is fitted to the main housing 1. A first link 78 connected to the first partition plate 65*a* through a pin 77*a* is coupled to one end of the arm 76. A second link 79 connected to the second partition plate 65*b* through a pin 77*b* is coupled to the other end of the arm 76. A spring 80 is hooked to the arm 76 so as to bias the arm 76 in the direction to separate the first partition plate 65*a* and the second partition plate 65*b* from each other (directions indicated by G1 and G2 in FIG. 13A, i.e., the direction along which the bills P placed on the partition plates 65*a* and 65*b* drop in the compartments 15*a* to 15*d*). A bent portion 76*a* is formed at the other end of the arm 76. A roller 83 is brought into rolling contact with the bent portion 76*a*. The roller 83 is rotatably mounted on a pivot arm 82 which rotates together with the drive shaft of a motor 81. When the shutter 65 is closed, the roller 83 abuts against the bent portion 76*a* against the biasing force of the spring 80. When the roller 83 abuts against the bent portion 76*a*, the first and second partition plates 65*a* and 65*b* are nested with each other so as to keep the bill in the collecting chamber 51.

When the arm 76 is located to be perpendicular to the pivot arm 82 fixed on the driving shaft of the motor 81, a dead point is constituted. For this reason, the first and second partition plates 65*a* and 65*b* cannot be manually separated from each other, thereby guaranteeing safe storage of the bills P in the compartments 15*a* to 15*d* to be described in detail later and hence providing unique construction.

The operation of the shutter unit 16 will now be described hereinafter.

In the state shown in FIG. 13A, when a predetermined number of bills are stored in the collecting chambers 51, the motor 81 is driven, and the drive shaft is rotated counterclockwise in the direction indicated by arrow A for a predetermined period of time. Upon rotation of the drive shaft, the pivot arm 82 pivots counterclockwise from a position where the roller 83 abuts against the bent portion 76*a* to a position shown in FIG. 13B. The roller 83 of the pivot arm 82 is separated from the bent portion 76*a*, and the arm 76 instantaneously pivots counterclockwise by the biasing force of the spring 80. The first partition plate 65*a* is moved in the direction indicated by arrow G1, and the second partition plate 65*b* is moved in the direction indicated by arrow G2. The bottoms (i.e., the dispensing ports 51*a*) of the collecting chambers 51 are simultaneously opened, as shown in FIG. 13B. The bills P then drop in the corresponding compartments 15*a* to 15*d*. The first and second partition plates 65*a* and 65*b* are instantaneously separated from each other, and the bills drop in the corresponding compartments without changing their postures.

Reference numeral 84 denotes a stopper of the arm 76; and 85, a sensor for detecting the movement of the arm 76 when the distal end of the arm 76 abuts against the sensor 85. Reference numeral 86 represents a stop sensor for detecting the closed state of the first and second partition plates 65*a* and 65*b*.

The closing operation of the first and second plates 65*a* and 65*b* will be described. When the operation of the push-in unit 17 to be described later is completed, and it is detected that no bill leans against the side walls, in the state shown in FIG. 13B, the motor 81 is energized again. The pivot arm 82 pivots counterclockwise in the direction indicated by arrow A. When the pivot arm 82 has reached a predetermined angular position, the roller 83 abuts against the bent portion 76*a*. Then, the roller 83 pivots the arm 76 clockwise against the biasing force of the spring 80. Thereafter, the one end of the arm 76 is detected by the stop sensor 86, and the motor 81 is stopped. Therefore, as shown in FIG. 13A, the first and second partition plates 65*a* and 65*b* come closer to each other and are nested, so that the dispensing ports 51*a* are closed.

In the shutter unit 16 operated as described above, the first and second partition plates 65*a* and 65*b* obtained by connecting four plates for the collecting chambers 51 of the first to fourth collecting units 14*a* to 14*d*, and the drive section 66 for simultaneously moving the first and second partition plates 65*a* and 65*b* are utilized to dispense or discharge the bills P placed in the collecting chambers 51 at once. Therefore, unlike the conventional structure wherein one shutter is provided to each collecting chamber 51, the manufacturing cost can be reduced to about ¼. Furthermore, only one shutter unit is used for a plurality of collecting chambers 51, so that malfunction can be reduced to ¼, and various other advantages can be obtained.

In order to drop the bills P which are horizontally stacked without inclining them, the first and second partition plates 65*a* and 65*b* must be instantaneously moved. According to one embodiment described above, the movement of the first and second partition plates 65*a* and 65*b* is fast due to use of a spring having a strong biasing force, and the apparatus is simple in construction.

The push-in unit 17 will be described in detail with reference to FIGS. 13A, 13B, 15 and 16. The push-in unit 17 is illustrated in detail in FIGS. 13A, 13B, 15 and 16. A slide rail 90 which can be vertically moved is mounted such that one end thereof is connected to the side frame 53 fixed to the main housing 1. A moving member 90*a* of the slide rail 90 is mounted on a frame 91 as a movable member. Push-in members 92 are attached to the frame 91 so as to correspond to the collecting chambers 51. The frame 91 is attached to the moving member 90*a*, so that the push-in member 92 is vertically movable in the corresponding collection chamber 51 (along the direction indicated by arrow B in FIG. 16). A bracket 93 of a moving mechanism 89 for driving the frame 91 is fixed to the main housing 1. A motor 94 and a bearing box 95 are mounted on the bracket 93. A bevel gear 96 is mounted on the output shaft of the motor 94. A bevel gear 98 is mounted at one end of a shaft 97 in the bearing box 95. The bevel gears 96 and 98 mesh with each other and constitute a power transmission mechanism 99. The power is transmitted from the motor 94 to the shaft 97 through the power transmission mechanism 99. An arm 100 is fixed to the other end of the shaft 97. A link 102 is mounted at the distal end of the arm 100 through a pin 101. A pin 103 is fixed on the frame 91, and the distal end of the link 102 is mounted on the pin 103. In this manner, the rotational force of the motor 94 is converted to a vertical movement and transmitted to the frame 91.

The operation of the push-in unit 17 will be described below.

Figure 15:
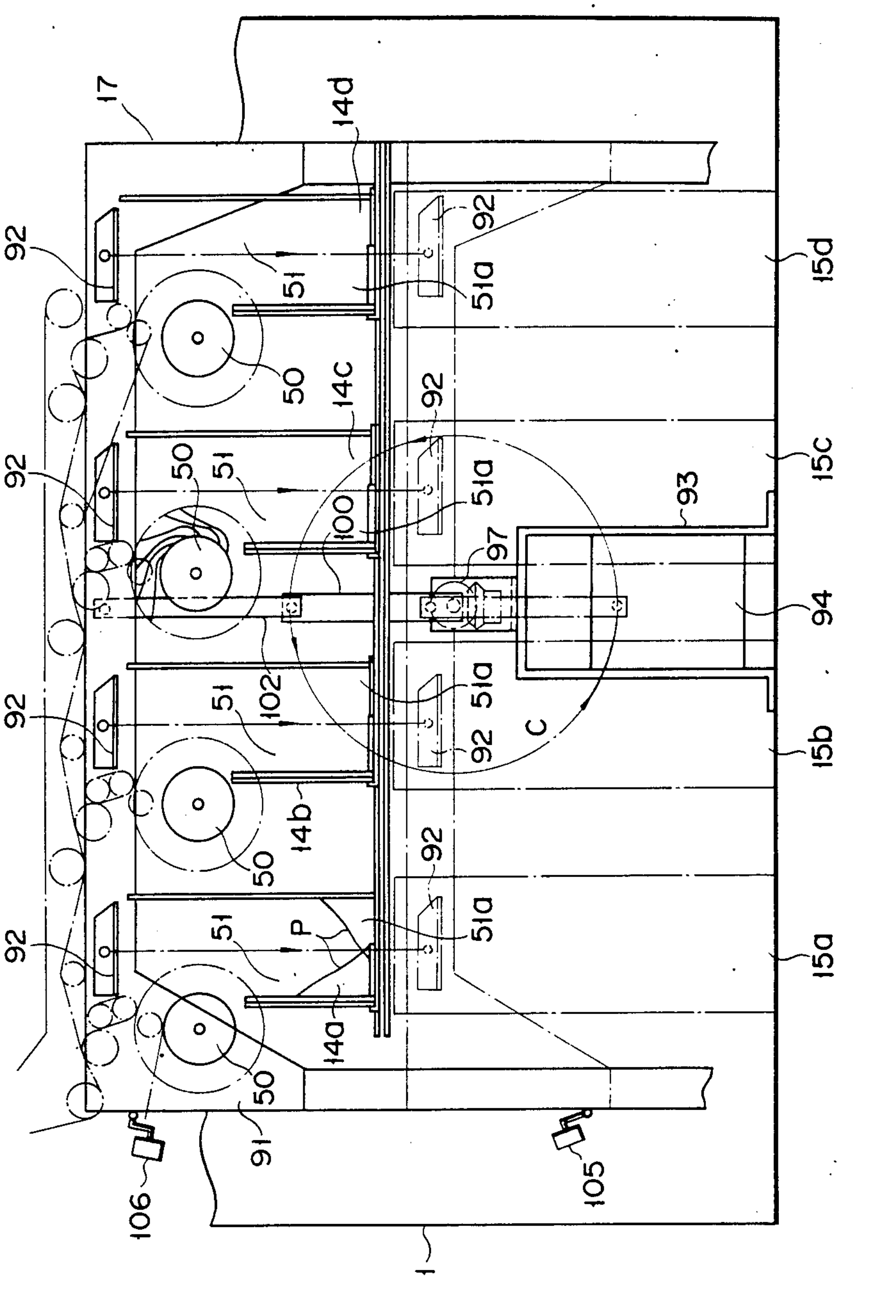
FIGS. 15 and 16 are respectively a front view and a side view of a push-in unit.
Figure 16:
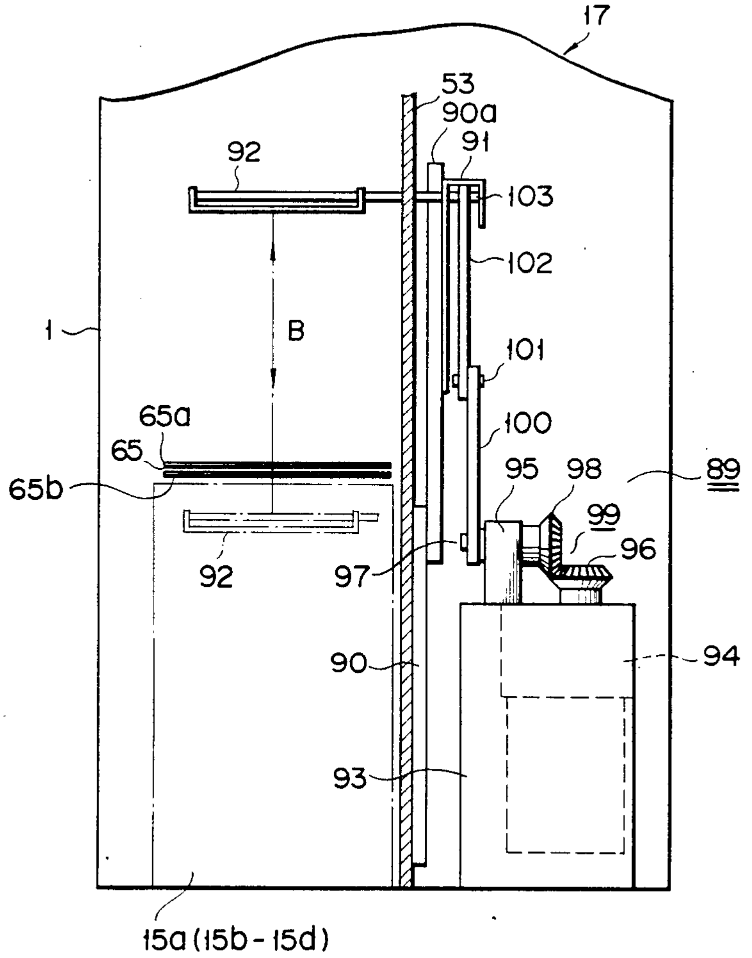

When a predetermined number of bills P are stacked in the collecting chambers 51, respectively, the shutter unit 16 opens the dispensing ports 51*a*, so that stacks of bills P freely drop in the compartments 15*a* to 15*d*. When the sensor 85 detects that the shutter unit 16 is operated, the moving mechanism 89 of the frame 91 is started. The motor 94 is driven, and the power of the motor 94 is transmitted from the bevel gear 96 to the bevel gear 98. The arm 100 is then rotated counterclockwise (the direction indicated by arrow C) in FIG. 15 through the shaft 97. The link 102 is mounted on the one end of the arm 100 through the pin 101, and the frame 91 is mounted on the link 102 through the pin 103. When the arm 100 is rotated in the direction indicated by arrow C, the push-in members 92 mounted on the frame 91 move downward, as shown in FIG. 15. Therefore, the push-in members 92 move into the compartments 15*a* to 15*d*, respectively. Therefore, the bills left undropped in the collecting chambers 51 are pushed into the compartments 15*a* to 15*d* respectively. When the arm 100 rotates through 180°, the frame 91 reaches the bottom dead point. When this is detected by a sensor 105, the push-in operation is completed. In other words, when the arm 100 revolves once, the frame 91 reciprocates once.

Some bills P are stacked in a standing posture in the collecting chambers 51, as shown in the first collecting chamber 51 of FIG. 15. By utilizing the push-in mechanism, the standing bills can be properly stored. As shown in FIG. 13A, projections 59*b* and 60*b* are respectively formed in the wall plates 59 and 60 of each collecting chamber 51. Each push-in member 92 has notches 92*a* nested with the corresponding projections 59*b* and 60*b*. Even if the standing bills are present in the collecting chambers, they can be properly pushed into the corresponding compartments 15*a* to 15*d*.

In the push-in unit 17 operated as described above, the bills P collected in the plurality of collecting chambers 51 are pushed in the corresponding compartments 15*a* to 15*d* at once. Therefore, unlike the conventional structure wherein four independent push-in units are disposed for the first to fourth collecting chambers and the corresponding compartments, the bills can be simulaneously pushed into the corresponding compartments according to the present invention. In this manner, only one drive unit is required, and the number of parts can be decreased, thereby reducing the cost to about ¼ the conventional cost.

Figure 17:
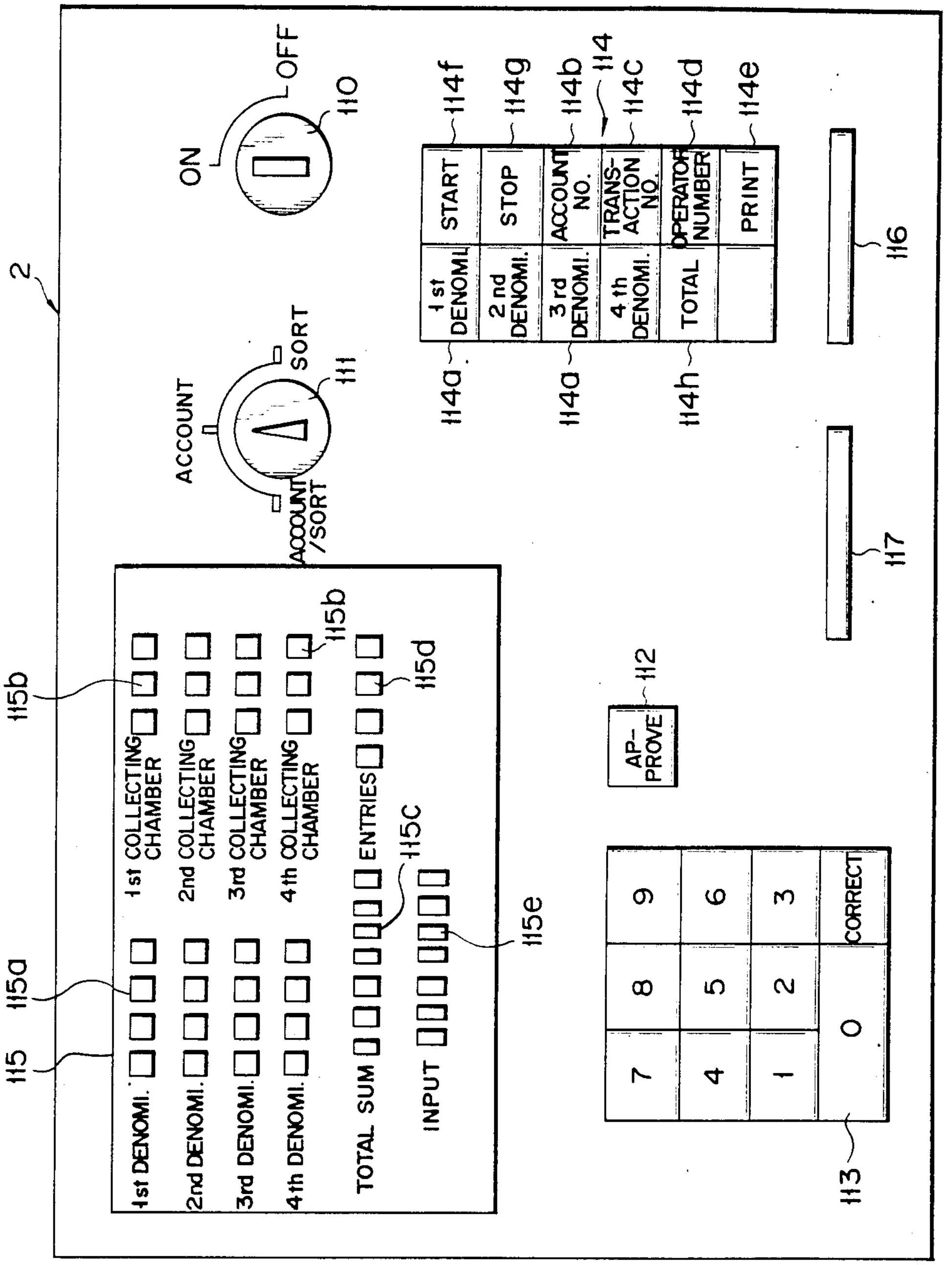
FIG. 17 is a front view of a display control panel.

The display control panel 2 has a layout shown in FIG. 17. The panel 2 has a power switch 110, a mode selection switch 111, an approve key 112, numeric keys 113, control keys 114, a display section 115, a card insertion port 116 and a slip dispensing port 117. The mode selection switch 111 serves to designate one of the sort, account, and accout/sort modes. The control keys 114 include denomination selection keys 114*a*, an operator number key 114*d* and a total key 114*h*. The display section 115 includes: display elements 115*a* each displaying the number of bills of a given denomination; display elements 115*b* each displaying the number of bills of a given collecting unit; a display element 115*c* for displaying a total sum; and a display element 115*e* for displaying the total number of bills.

The operation of the display control panel 2 having the layout described above will be described below. For example, when the operator sets the mode selection switch 111 in the account/sort mode, a control section (not shown) is set in the account/sort mode. The operator depresses an account number key 114*b* and types his savings account number with the numeric keys 113. He also depresses a transaction number key 114*c* and types the transaction number with the numeric keys 113. He then depresses an operator number key 114*d*, and types the operator number with the numeric keys 113. The account number, the transaction number and the operator number are displayed at the display element 115*e*, so that the operator can check whether or not the input information is correct. The bills P deposited in the savings account are inserted in the bill insertion port 3 in a vertical posture. In this case, these bills consist of a maximum of four denomination bills or notes, but are not detected as the obverse-/reverse-presented bills. The operator then depresses a start key 114*f*. Each bill P is conveyed in the take-in unit 5, the convey path 6 and the discrimination section 7. The bill is discriminated as an obverse-/reverse-presented bill by the discrimination section 7. In this case, the obverse-presented bill is conveyed in the first convey path 9, while the reverse-presented bill is conveyed in the second convey path 11. The reverse-presented bill is reversed by the convey path 20, so that the bills merge with originally obverse-presented bills in the merge section 12. These bills are stored in the compartments 15*a* to 15*d* through the sorting convey path 13, the collecting units 14*a* to 14*d*, the shutter unit 16 and the push-in units 17. The sorted bills by the discrimination section 7 in accordance with the four denominations are displayed at the display elements 115*a*, respectively. At the same time, the numbers of bills are also displayed at the display elements 115*b*, respectively. The total sum is displayed at the display element 115*c*. Thereafter, when the operator depresses a print key 114*e*, the control section (not shown) causes the printer to print the account number, the transaction number, the operator number, the number of bills of each denomination, a sum of bills of each denomination, a total number of bills, and a total sum of bills. The number of bills of each denomination and the total sum can be calculated together with the account number, the transaction number and the operator number for a time deposit account or an accumulation acount in the same manner as described above.

A crank mechanism using the bevel gears 96 and 98 is used as the push-in drive mechanism. However, the push-in drive mechanism is not limited to this construction. For example, a ball screw may be mounted on one end of the frame 91 so as to reciprocate the frame 91, thereby obtaining the same effect as in the above embodiment. Alternatively, a chain or belt mechanism can be used in place of the crank mechanism.

Reference numerals 120 denote bill sensors each detecting the presence/absence of the bill P.

The present invention is not limited to the above embodiment. Although the present invention is applied to a bill sorter/collector for collecting the bills in the above embodiment, various types of paper other than bills can be collected. Paper sheets stacked in the collecting chamber need only be discharged outside the collecting chamber by opening the dispensing port thereof.

In the above embodiment, bills are stored in the compartments. However, paper sheets may be placed on the convey path.

Various changes and modifications of the present invention may be made within the spirit and scope of the present invention.

As described above, the sheet convey apparatus of the present invention is characterized by comprising a first convey path for conveying obverse-presented bills, which are distinguished from reverse-presented bills by a sorting means; and a second convey path disposed parallel to the first convey path, for conveying reverse-presented bills which are to be reversed. Therefore, even if the obverse or reverse sides of the bills are unknown, the obverse-presented bills are automatically collected. The paper convey apparatus of the present invention is particularly suitable for a paper sorter/stacker which requires either obverse-presented bills or reverse-presented bills.

What is claimed is:

1. A sheet convey apparatus for conveying a mixture of obverse-and reverse-presented sheets, set at an inlet port, to collecting means, said sheets having a lengthwise direction, said apparatus comprising:

take-in means for taking in the sheets set at said inlet port, one at a time, and conveying said sheets in a direction perpendicular to said lengthwise direction;

sorting means for sorting the sheets taken in by said take-in means into a first group of obverse-presented sheets and a second group of reverse-presented sheets;

first conveying means for conveying the obverse-presented sheets which were sorted into the first group by said sorting means to a trailing end of said first conveying means and for conveying said sheets in said direction perpendicular to said lengthwise direction;

second conveying means for reversing the reverse-presented sheets which were sorted into the second group by said sorting means and conveying the obverse-presented sheets thus reversed to a trailing end of said second conveying means, said trailing ends of said first and second conveying means being arranged so as to merge, and for conveying said sheets in said direction perpendicular to said lengthwise direction, said second conveying means including:

a twisted convey path having an inlet port region and an outlet port region, said twisted convey path being arranged so as to clamp the sheets fed from said inlet port region and convey them to said outlet port region, while turning the sheets 180°, said twisted convey path being defined by the mutually opposing surfaces of a belt, one end of which is twisted by 720° with respect to the other end thereof and is coupled to the other end to form an endless belt, said endless belt being looped in a substantially 8-shaped manner so that portions of said endless belt are brought into surface contact at an intersection and are twisted in the same direction by 180°, about an axis perpendicular to a longitudinal direction of said endless belt, while being driven, said endless belt having a width narrower than a length of the sheet along the longitudinal direction; and twisted guide means disposed at both sides of said twisted convey path and therealong, for supporting the two ends of the sheet being twisted and conveyed, said twisted guide means including first and second guide members which extend along both edges of said twisted endless belt, the first guide member having inlet and outlet portions, the inlet portion being in contact with one surface of one end portion of the sheet and the outlet portion being in contact with the other surface of one end portion of the sheet, the second guide member having inlet and outlet portions, the inlet portion being in contact with the other surface of the other end portion of the sheet and the outlet portion being in contact with one surface of the other end portion of the sheet, so that the sheet is turned by the twisted convey path and the twisted guide means; and third conveying means for conveying merged obverse-presented sheets to said collecting means and for conveying said said sheets in a direction perpendicular to said lengthwise direction.

2. The apparatus according to claim 1, wherein said second conveying means includes at least two support rollers around which said endless belt is looped in a substantially 8-shaped manner.

3. The apparatus according to claim 2, wherein said second conveying means includes a first roller which is inclined by a predetermined angle with respect to said support rollers, in such a way as to be brought into rotatable and rolling contact with that portion of said endless belt which defines said twisted convey path and is located at an opposite side with respect to the twisted direction, thereby supporting said portion of said endless belt and keeping said twisted convey path in position.

4. The apparatus according to claim 3, wherein said first roller is located at a substantially central portion of said twisted convey path, in the direction of conveyance.

5. The apparatus according to claim 2, wherein said second conveying means includes a second roller which is rotatably disposed in such a way as to be brought into rolling contact with an outer surface of said mutually opposing surfaces of said twisted convey path, so as to constitute a flat convey path with respect to one of the support rollers located at said outlet port region.

6. The apparatus according to claim 1, wherein said guide means includes third and fourth guide members, the third guide member extending along the first guide member so that one end portion of the sheet is sandwiched between the first and third guide members, and the fourth guide member extending along the second guide member so that the end portion of the sheet is sandwiched between the second and fourth guide members.

7. The apparatus according to claim 1, wherein said guide members are guide plates each having a substantially flat surface contacting the end portion of the sheet and each extending substantially in parallel with the mutually opposite surfaces of the twisted convey path.

8. The apparatus according to claim 1, wherein said guide members are guide wires.

9. The apparatus according to claim 1, wherein the first and second guide members are intersected with each other.

10. The apparatus according to claim 1, which further includes rollers which apply a tension onto the endless belt.

* * * * *